US011943681B2

(12) United States Patent
Hernando De Castro et al.

(10) Patent No.: US 11,943,681 B2
(45) Date of Patent: Mar. 26, 2024

(54) HUMAN MOBILITY MEASURING METHOD

(71) Applicant: KIDO DYNAMICS SA, Lausanne (CH)

(72) Inventors: Alberto Hernando De Castro, Lausanne (CH); David Mateo, Lausanne (CH)

(73) Assignee: KIDO DYNAMICS SA, Lausanne (CH)

(*) Notice: Subject to any disclaimer, the term of this patent is extended or adjusted under 35 U.S.C. 154(b) by 231 days.

(21) Appl. No.: 17/288,521

(22) PCT Filed: Oct. 15, 2019

(86) PCT No.: PCT/EP2019/077997
§ 371 (c)(1),
(2) Date: Apr. 24, 2021

(87) PCT Pub. No.: WO2020/083713
PCT Pub. Date: Apr. 30, 2020

(65) Prior Publication Data
US 2021/0392463 A1 Dec. 16, 2021

(30) Foreign Application Priority Data
Oct. 25, 2018 (EP) .................... 18202716.9

(51) Int. Cl.
H04W 4/00 (2018.01)
H01Q 1/24 (2006.01)
H04B 7/06 (2006.01)
H04M 15/00 (2006.01)
H04W 4/029 (2018.01)

(52) U.S. Cl.
CPC ............ H04W 4/029 (2018.02); H01Q 1/246 (2013.01); H04B 7/0634 (2013.01); H04B 7/0656 (2013.01); H04M 15/41 (2013.01)

(58) Field of Classification Search
CPC ...... H04M 15/41; H04M 15/44; H04M 15/53; H04M 15/58; H04M 15/765; H04M 15/77; H04M 15/771; H04M 15/774; H04M 15/8033; H04M 15/31; H01Q 1/246; H04L 67/535; H04L 12/14; H04W 4/029; H04W 4/24; H04B 7/0634; H04B 7/0656; G08G 1/012; G06Q 10/0639
See application file for complete search history.

(56) References Cited

U.S. PATENT DOCUMENTS

| | | | | |
|---|---|---|---|---|
| 7,136,636 B1* | 11/2006 | McLaughlin | ......... | H04M 15/90 379/112.01 |
| 8,788,185 B2* | 7/2014 | Yen | ....................... | G08G 1/0133 701/119 |
| 9,374,800 B2* | 6/2016 | Cao | ........................ | H04M 15/58 |
| 9,723,441 B2* | 8/2017 | Dong | .............. | H04W 36/00837 |
| 9,843,902 B1* | 12/2017 | Skudlark | ............... | H04W 4/029 |
| 2002/0119766 A1* | 8/2002 | Bianconi | .................. | H04L 12/14 455/406 |
| 2003/0125013 A1* | 7/2003 | Mizell | .................... | H04M 15/00 455/466 |
| 2003/0186678 A1* | 10/2003 | Lucidarme | .............. | H04W 4/24 455/406 |
| 2004/0038666 A1* | 2/2004 | Lohtaja | ............... | H04W 12/126 455/410 |
| 2005/0111640 A1* | 5/2005 | Moisey | .................. | H04Q 3/005 379/126 |
| 2005/0226400 A1* | 10/2005 | Farber | ............... | H04M 15/8044 379/112.01 |
| 2005/0281399 A1* | 12/2005 | Moisey | ................. | H04M 15/73 379/114.01 |
| 2006/0293025 A1* | 12/2006 | Chiou | ..................... | H04W 4/08 455/456.1 |
| 2009/0005036 A1* | 1/2009 | Ashraf | ..................... | H04W 8/06 455/433 |
| 2009/0318132 A1* | 12/2009 | Chiou | ................... | H04W 24/08 455/423 |
| 2010/0134288 A1 | 6/2010 | Huang et al. | | |
| 2011/0171931 A1* | 7/2011 | Kortesniemi | ........... | H04L 12/14 455/407 |
| 2011/0212721 A1* | 9/2011 | Chang | ................... | H04M 15/80 455/433 |
| 2012/0009904 A1* | 1/2012 | Modi | ..................... | H04W 4/029 455/456.1 |
| 2012/0009972 A1* | 1/2012 | Viering | ................. | H04W 36/22 455/525 |
| 2012/0115475 A1* | 5/2012 | Miyake | ................. | H04W 4/021 455/435.1 |
| 2012/0194389 A1* | 8/2012 | Faragher | ................... | G01S 5/10 342/450 |
| 2012/0282888 A1 | 11/2012 | Frias Martinez | | |

(Continued)

FOREIGN PATENT DOCUMENTS

WO 2012072153 A1 6/2012

OTHER PUBLICATIONS

International Search Report dated Dec. 16, 2019.

Primary Examiner — Stephen M D Agosta
(74) Attorney, Agent, or Firm — William H. Honaker; Dickinson Wright PLLC

(57) ABSTRACT

The invention relates to a human mobility measuring method comprising a structuring step where CDR raw metadata is filtered so as to identify a device identification, a cell site identification, a date, and a time; a data frame generating and sorting step where the filtered CDR metadata is sorted and the filtered sorted CDR metadata are projected into an occupancy grid comprising a location vs. time-bin matrix, a probabilistic map generating step of a device's location in space and time, and a filtering step to accurately represent human mobility from patterns that reflect errors, uncertainties, or patterns not related with real human mobility. The method further comprises a gap filling process allowing for a continuous localization of the device by extrapolating any trajectory in space and time of any device and a projecting step comprising projecting the trajectories defined at a Voronoi grid defined by the sites and towers to the road and street grid.

10 Claims, No Drawings

(56) References Cited

U.S. PATENT DOCUMENTS

| | | | | |
|---|---|---|---|---|
| 2014/0024389 A1* | 1/2014 | Martinez | ............... | H04L 67/52 |
| | | | | 455/456.1 |
| 2015/0146689 A1* | 5/2015 | Fu | ............... | H04W 36/023 |
| | | | | 370/331 |
| 2015/0304863 A1* | 10/2015 | Gupta | ............... | H04W 8/02 |
| | | | | 455/457 |
| 2016/0142917 A1* | 5/2016 | Calo | ............... | H04W 4/029 |
| | | | | 705/7.33 |
| 2016/0262681 A1* | 9/2016 | Patterson | ............... | A61B 5/165 |
| 2017/0041762 A1* | 2/2017 | Colonna | ............... | H04W 4/029 |
| 2021/0365854 A1* | 11/2021 | Boss | ............... | G06Q 10/0635 |

\* cited by examiner

HUMAN MOBILITY MEASURING METHOD

CROSS-REFERENCE TO RELATED APPLICATIONS

The present application is a 35 U.S.C. § 371 national stage application of PCT Application No. PCT/EP2019/077997, filed on Oct. 15, 2019, which claims priority to EP Patent Application No. 18202716.9, filed on Oct. 25, 2018, the entire contents of which are incorporated by reference in their entirety.

TECHNICAL FIELD

The present invention relates to a location technology, and more specifically, to location method based on call detail record. More particularly, the present invention relates to a method of using metadata and Call Detail Record of a cell phone for measuring collective human mobility activity and crowdedness for transportation.

BACKGROUND OF THE ART

Cell sites and cell towers form a dense network covering almost exhaustively the areas with relevant human activity in a region. The antennas located at the cells provide connectivity to any cell phone belonging to its network. The metadata of these connections (time and day of the telecommunication event, identification of the antenna, identification of the device/user, etc.) are recorded and collected at the Call Detail Record (CDR). A call detail record (CDR) is a computer record created by a telephone exchange. It includes the details of a phone call established through the telephone exchange, including an automated record of the length of each telephone call.

CDR were originally designed to track the telecommunication activity of any device for billing purposes such as disclosed in US 2016/330328. More particularly, CDRs are created by telephone exchanges' billing systems. The CDRs are saved by the transmitter exchange until the call ends. The computer networks transport CDRs to a central point. Several links are used worldwide for transporting CDRs. A call accounting program is typically used for recovering and processing CDR data. This system is also known as a business support system (BSS). In the billing system, the price of the call is estimated by using the length of the call from the CDR. It can also be used for providing customized advertisement to the users as disclosed in KR 20160091597.

However, the general procedure of recollection of the metadata is not designed to allow the cell towers to act as, for instance, gauging stations for crowdedness or human mobility. In fact, cell sites and cell towers are devices designed to provide radio signal to mobile phones such that mobile telecommunication companies have deployed a dense network of cell sites covering most of the areas with human activity. The main criterion for the installation of the towers is to ensure connectivity coverage for cell phones in those areas based on the potential activity of the users' mobile devices. Even if this criterion correlates the density of antennas with the density of population, this match is not perfect. Thus, the distribution of towers does not respond to the needs required for a network oriented in gathering information of human mobility.

In addition, the data collected at the tower, the CDR, are designed to gather the information useful for billing purposes, registering every telecommunication event produced by every device. Thus, this data was not originally designed to be used as proxy of human mobility.

While CDR metadata has been used before for analyzing human mobility, no systematic or standardized procedure has been described yet proving the accuracy and reliability of the data used for those analysis. In general, the filter methods are designed in a case-by-case basis relying on the specific data set to be analyzed because of the region or the events registered, with no certainty that the same procedure properly works for a different set of cell sites and towers. In addition, the art disclosures working with CDR do not provide in general access to the original data set, and no replicability is possible for others to test the accuracy. Errors or misleading data entries may lead to wrong measures and conclusions regarding mobility patterns, and thus the need of a solid and standardized procedure is growing.

There is therefore a need for a procedure that allows to use cell sites as gauging stations for crowdedness and human mobility which overcomes the limitations mentioned before and generates a data set specially designed to properly analyze human mobility.

In this regard, a primary object of the invention is to solve the above-mentioned problems and more particularly to provide a method permitting to properly and repeatedly monitor human mobility through the use of CDR.

Another problem is that the distribution of events along a single day per user or device uses to present a scattered pattern, with a high number of events concentrated in small periods of time between gaps of no activity. These gaps are very common, which limits the accuracy of any measure on crowdedness or mobility made by cell sites and towers. In this regard, another object of the invention is to solve the above-mentioned problems and more particularly to provide a method permitting to properly and repeatedly monitor human mobility through the use of CDR by filing these gaps.

A further problem is that, sites and towers use to cover extended areas that can be as big as dozens of square kilometers, which represents in many cases a big uncertain in the localization of the devices. Indeed, human mobility is useful in general when referred to streets or roads, far beyond the resolution of the towers. In this regard, another object of the invention is to solve the above-mentioned problems and more particularly to provide a method to extend the use of cell sites and towers allowing for an increase of the resolution originally provided by the cell sites and towers.

SUMMARY OF THE INVENTION

The above problems are solved by the present invention. It is based on a method that allows for a robust and versatile calibration of the data generated at the cell sites that can be used in any region or country for any set of cell sites and towers, for any set of CDRs. In a preferred embodiment, CDRs are filtered and transformed into an accurate proxy of mobility, and probabilities of occupancy are used to compensate the mislocations of the cell sites.

The present invention comprises a method comprising to (i) clean, filter, and analyze the metadata collected at the CDR to adapt it for human mobility; and (ii) estimate most probable users' locations in the cell network or in an arbitrary predefined spatial network. This procedure allows cell sites to be efficiently used as sensors to measure collective human mobility activity and crowdedness for transportation, tourism and/or marketing, among other applications.

A first aspect of the invention is Human mobility measuring method wherein a set of cell sites and/or towers, each comprising an antenna, distributed in a certain region and operating for a certain period of time giving support to a certain number of devices, wherein at each site, metadata of every telecommunication events concurring at its coverage area along this period of time are collected, and all the data is centralized in a single or multiple set of CDR raw metadata, said method comprising a structuring step where CDR raw metadata is filtered so as to identify at least one of a device identification, a cell site identification, a date, and a time, a data frame generating and sorting step where the filtered CDR metadata is sorted by user, by date, and by time, a projecting step where the filtered sorted CDR metadata of each device are projected into an occupancy grid comprising a location vs. time-bin matrix, where locations are defined by groups of sites or towers, and time is divided in bins of arbitrary size, a probabilistic map generating step of a device's location in space and time, and a filtering step consisting in filtering devices and events that accurately represent human mobility from patterns that reflect errors, uncertainties, or patterns not related with real human mobility.

According to a preferred embodiment of the present invention, each device and each antenna are univocally identified.

Advantageously, at least one of the groups is composed of a single site.

Preferably, the filtering step comprises filtering devices when more than one person is using the same number or duplicated SIM cards.

Advantageously, the filtering step comprises filtering devices when two or more devices communicate with each other in a regular basis and systematically from the same locations.

According to a preferred embodiment of the present invention, the filtering step comprises filtering devices when in locations covered by several sites, the device may dynamically switch its connectivity between even if no movement is related with the event.

Preferably, the filtering step comprises filtering devices when a cell is reaching its maximum capacity, nearby cells are assigned to handle the extra events.

Advantageously, the method further comprises a gap filling process allowing for a continuous localization of the device by extrapolating any trajectory in space and time of any device.

According to a preferred embodiment of the present invention, the gap filling process comprises a first step consisting in representing the events registered at CDR as vectors which components are the amplitude of probabilities of occupation for each location and time, a second step of constructing a density matrix from the vectors set obtained in the first step, a third step of diagonalizing the density matrix obtaining a basis of orthonormal vectors, assuming that basis are also the eigenvectors of an underlying pseudo-Hamiltonian, a third step of obtaining, for any incomplete vector, the coefficients of this vector in the basis of the pseudo-Hamiltonian limited in the subspace where this vector is defined, a fourth step of extrapolating these coefficients to the subspace where the vector is not defined, and a fifth step of obtaining the probabilities of occupation as the square of the obtained amplitudes.

Preferably, the method further comprises a projecting step comprising projecting the trajectories defined at a Voronoi grid defined by the sites and towers to the road and street grid.

Advantageously, the method uses virtual agents moving randomly inside the road grid mimicking movements of users in the real world, and select those which path and velocity are compatible with the events registered at the CDRs.

According to a preferred embodiment of the present invention, the method further comprises assigning a probability or likelihood to each agent to represent the pattern that generates the observed events and aggregate all the agent's paths weighted by this likelihood to be used as a statistical measure of the empirical human mobility of the region.

The particular advantages of this device of the invention being similar to the ones of the method of the first aspect of the invention, they will not be repeated here.

DETAILED DESCRIPTION OF THE INVENTION

The present detailed description is intended to illustrate the invention in a non-limitative manner since any feature of an embodiment may be combined with any other feature of a different embodiment in an advantageous manner.

In the method of the present invention, one first assumes a set of cell sites and towers distributed in a certain region and operating for a certain period of time giving support to a certain number of devices. Each device and each antenna are univocally identified. At each site, the metadata of every telecommunication events concurring at its coverage area along this period of time are collected, and all the data is centralized in a single or multiple set of data, the CDR. At this point, the method of the invention carries out three steps:

The first step is a structuring step where CDR raw metadata is filtered so as to identify the fields of: device identification, cell site identification, date, and time. Once filtered, the data frame is generated and sorted by user, by date, and by time, preferably in this hierarchical order.

The second step is a projecting step into an occupancy grid where locations are defined and univocally identified by groups of sites or towers, were groups are allowed to be composed of a single site, and time is divided in bins of arbitrary size. For each device, events are projected into a location vs. time-bin matrix which we will call the occupancy grid in the following description.

In an occupancy grid G, the value of the entry G (time, location) is proportional to the certainty that the device was present at location at some point during the time-bin time, given the events registered. Since the sites and times can be grouped such that a device visits more than one location during a given time-bin, the values of the occupancy grid are in principle independent of each other. To project the events into this grid, one defines the network of conditional probabilities P=p(L|E) denoting the probability that the device visited the location L given that a series of events E is registered during that time bin.

Given the events and the conditional probabilities P, a maximum likelihood analysis provides a closed-form for the values of the occupancy grid as $$G = \frac{1}{1 + \exp\left(-\sum_{i=0}^{n} s_i\right)} \text{ where}$$

$$s_i = \log\{p(L \mid E_i)\}/\log\{1 - p(L \mid E_i)\}.$$

In practice, the simplest implementation of this method consists of the following steps:
1. Assign a positive number h>0 to the belief of a device being in a certain location if we have an event on that location.
2. Assign a negative number m<0 to the belief of a device not being in a certain location if we have an event on another location. Typically, one wants |m|<|h|.
3. Start a matrix S of size (num. of locations)×(num. of time-bins) with all the entries set to 0.
4. For each event registered, add h to the entry of S corresponding to the location of that event, and subtract m from every other entry at that time-bin.
5. Finally, compute the occupancy grid as G=1/(1+exp(-S)).

The projection onto the occupancy grid generates a probabilistic map of a device's location in space and time as opposed to a single inferred trajectory. Thanks to this method, the projection is known to effectively provide an outlier filtering of the registered events, and is thus a first layer of automated, general, filter of CDR events. Also, it provides a measure of uncertainty in the information that traditional trajectory-filtering methods do not provide: if the events registered for a certain device switch erratically between locations the resulting occupancy grid will have very low values at all locations—signifying high uncertainty—that are easy to filter out in the third stage.

The third step is a filtering step consisting in filtering devices and events for human mobility purposes where the method uses an analysis of the patterns observed in each user's occupancy grid to filter those that accurately represent human mobility from patterns that reflect errors, uncertainties, or patterns not related with real human mobility as machine-to-machine telecommunications, call centers, or technology-related false positives as changes on the connection to sites even if the device has not changed its position.

The desired filters for discarding devices or events that do not contribute to the analysis of human mobility are defined at this stage and comprise the following:
(i) Duplicated devices: if more than one person is using the same number or duplicated SIM cards, it is registered at the CDR as a single device but with overlapping events. Overlapping activity has a distinguishable imprint when projected to the occupancy grid. If that pattern is detected at the occupancy grid of a device, that device is rejected for next analysis.
(ii) Machine-to-machine: if two devices (or a network of them) communicate each other in a regular basis and systematically from the same locations, the occupancy grid takes a distinguishable pattern. If this pattern is detected, those devices are rejected for mobility purposes.
(iii) False mobility positives: in locations covered by several sites, the device may dynamically switch its connectivity between even if no movement is related with the event. This effect generates a characteristic "ping-pong" pattern in the occupancy grid for adjacent cells. When this pattern is detected, probabilities are uniformly corrected.
(iv) False occupancy positives due to saturation of the network: when a cell is reaching its maximum capacity, nearby cells are assigned to handle the extra events. This effect generates a false positive in the occupancy grid. Probabilities are distributed assigning a higher probability to the saturated antenna, as potential real location of the device.

The present invention provides several advantages among which an enhanced versatility because this method explicitly encodes the assumptions made about the nature of the data into the parameters of P, h and m. Therefore, it allows to formulate and test a large number of hypotheses about the mechanical working of the CDRs in particular areas of interest and compare the results by tuning P. Given enough data, this framework also allows to apply machine learning techniques to "train" the values of P. Also, it provides an improved scalability since the method is linear in time with respect to the number of registered events and linear in memory with respect to the number of locations considered. In contrast with traditional interpolation/filtering techniques, it only requires a single read of each event and does not need to store any temporary values other than the additive matrix S. As such, the algorithm fits into a map-reduce framework that is optimal to analyze large datasets. Finally, it is iterative. In fact, by storing the values of S described above, the occupancy grid can easily accommodate new data by just updating S as per point 4 in the algorithm. This also means that we can set up a feedback loop where the analysis of movement patterns using the occupancy grids of a large collection of devices can be included itself as new data points into the computation of the occupancy grid.

When carrying out the above method it is also important that the calibration considers that mobile phone users do not use the device in a regular basis in time allowing for a continuous localization of the device.

In order to improve this method, these activity gaps require to be filled with an educated guess to have a complete picture of the mobility patterns and consider cell sites and towers as accurate devices for this purpose. A preferred embodiment of the present invention uses physical concepts to describe, reproduce and predict collective human behavior. Using this framework, the preferred embodiment of the present invention can use quantum physics principles where a Hilbert space is used as representation of the underlying dynamics and the device's activity is represented as a superposition of eigenstates of a pseudo-Hamiltonian. The extrapolation of this superposition is assumed as an accurate representation of the missing information in the activity gaps. In this fashion, the reconstruction is self-consistent and data-driven as no external guesses or models are introduced. The reconstruction allows to use cell sites and towers as accurate devices for human tracking, obtaining a complete picture of mobility patterns.

More particularly, described below is a procedure to fill these gaps self-consistently with the collected data without introducing external assumptions or modelizations. As mentioned, the method is based on social physics and described using bracket notation, as many of the concepts used in its derivation are borrowed from quantum physics (Hilbert spaces, superposition of states, density matrices, etc.). In analogy to quantum mechanics, one defines a state as the full set of amplitudes of probability of finding a device at a location at a time, represented as a vector in a high-dimensional vector space. A set of the most complete states is used first to define the Hilbert space describing the underlying dynamics from the diagonalization of the density matrix. Assuming a thermal equilibrium maximizing the entropy of the system, the eigenstates and occupation numbers obtained from the diagonalization of the density matrix are used in a second step to define the pseudo-Hamiltonian which is the generator of all dynamical states, and responsible of their evolution.

Thus, any trajectory in space and time of any device is expressed as a superposition of the eigenstates of the pseudo-Hamiltonian. The superposition is assumed to accurately reproduce the dynamical state for all positions and time. Thus, its extrapolation to the gaps represents an accurate reconstruction of the missing information. Once the gaps are filled, one considers that the dataset is accurate enough to describe the full picture of human mobility in that region.

In more details, one first assumes a set of $N_c$ cell sites and towers distributed in a certain region at positions $r_i$ (i=1, ... $N_c$) and operating for a certain period of time T giving support to a certain number of devices N. Each device and each antenna are univocally identified with an integer $\alpha(\alpha=1, \ldots, N)$ and i respectively. At each site, the metadata of every telecommunication event concurring at its coverage area along this period of time are collected, and all the data is centralized in a single or multiple set of data, the CDR.

One assumes that one can define from the data extracted from the CDR (or the occupancy matrix) the probability of finding device a at the area covered by site i at time t as $p_\alpha(r_i, t)$. This probability fulfills the normalization condition $$\frac{1}{T}\int_T dt \sum_{i=1}^{N_c} p_\alpha(r_i, t) = 1, \quad (1)$$

which is automatically fulfilled if $$\sum_{i=1}^{N_c} p_\alpha(r_i, t) = 1 \quad (2)$$

or, in other words, if the probability of finding device a at any location at time t is equal to 1.

One then introduces the bracket notation and define the state $|r_i,t\rangle$ as a vector containing all information about location (i) and time (t). More generally, one defines $|\alpha\rangle$ as the state of the device a as a vector which components are the amplitudes of probability for each location and time, defined as $$|\alpha\rangle = \frac{1}{T}\int_T dt \sum_{i=1}^{N_c} \phi_\alpha(r_i, t)|r_i, t\rangle, \text{ where} \quad (3)$$

$$\phi_\alpha(r_i, t) = \sqrt{p_\alpha(r_i, t)} e^{is_\alpha(r_i,t)}. \quad (4)$$

At this point, the value of the phase $s_\alpha(r_i,t)$ is arbitrary and undefined, so in lack of a better choice one sets $s_\alpha(r_i,t)=0$ for all $\alpha$, i and t. It can be proved with this definition that $\langle\alpha|\alpha\rangle=1$, fulfilling the normalization condition.

Then one defines a pseudo-Hamiltonian $\mathcal{H}$ as generator of the system's dynamics. The eigenstates $|m\rangle$ of $\mathcal{H}$ are orthonormal and define a complete Hilbert space able to describe any arbitrary dynamical state $|\alpha\rangle$ which is taking place in the system. In terms of the location-time states one writes $$|m\rangle = \frac{1}{T}\int dt \sum_{i=1}^{N_c} \psi_m(r_i, t)|r_i, t\rangle. \quad (5)$$

The system can be then univocally characterized by the density matrix $$\rho = \sum_{m=1}^{N} N_m |m\rangle\langle m| \quad (6)$$

where $N_m$ are the occupancy of state m with $\Sigma_{m=1}^{N}N_m=N$ (as shown below).

The density matrix elements can be obtained in the empirical non-orthogonal basis set of states constructed from the CDRs as $$\rho_{\alpha\beta} = \langle\alpha|1|\beta\rangle = \frac{1}{T}\int_T dt \sum_{i=1}^{N_c} \phi_\alpha(r_i, t)\phi_\beta(r_i, t). \quad (7)$$

It can be shown that $\rho$ contains the same information in any base, meaning that this representation of $\rho$ and the one expressed in terms of the eigenstates of $\mathcal{H}$ are univocally related. Thus, since the eigenstates $|m\rangle$ also are eigenstates of $\rho$, they can be obtained from the diagonalization of $\rho$ in its form in the empirical non-orthogonal basis.

The eigenvalues obtained are the above-mentioned occupancy, representing the number of devices in each eigenstate $|m\rangle$. Indeed, it is a well-known property that the trace of $\rho$ is conserved in any base, thus $$Tr\rho = \sum_{\alpha=1}^{N} \langle\alpha|\alpha\rangle = \sum_{m=1}^{N} N_m = N \quad (8)$$

Assuming that the system is in a thermal equilibrium described by the maximum entropy principle, the occupancy numbers are related with the eigenvalues $\epsilon_m$ of the Hamiltonian as $N_m = ce^{-\epsilon_m/k}$, where $c=N/\Sigma_{m=1}^{N}e^{-\epsilon_m/k}$ and k is an arbitrary thermal constant. The Hamiltonian can be reconstructed as $$\mathcal{H}/k = -\sum_{m=1}^{N} \ln(N_m)|m\rangle\langle m| + C \quad (9)$$

where C is a constant that does not affect the dynamics.

Then one defines an uncomplete state $|\omega\rangle$ defined oy in a subspace of time T' contented in T. In order to use the eigenstates $|m\rangle$ to describe $|\omega\rangle$, siders the lack of orthonormality of the basis in the subspace defined by T', writing $$|\omega\rangle = \sum_{m=1}^{N} a_m |m\rangle \text{ where} \quad (10)$$

$$a_m = \frac{1}{T'}\int_{T'} dt \sum_{i=1}^{N_c} \phi_\omega(r_i, t) \sum_{m'=1}^{N} (S^{-1})_{mm'} \psi_{m'}^*(r_i, t) \quad (11)$$

being $S^{-1}$ the inverse of the overlap matrix defined as $$S_{mm'} = \frac{1}{T'}\int_{T'} dt \sum_{i=1}^{N_c} \psi_m(r_i, t)\psi_{m'}^*(r_i, t) \quad (12)$$

Once one obtains the set of coefficients $\alpha_m$, representing the overlap of state $|\omega\rangle$ with the eigenstates of the pseudo-Hamiltonian, one extends the same coefficients beyond T' to all period T.

The final step to the reconstruction is to obtain the probabilities for times outside the domain of T' as $$p_\omega(r_i, t) = \left|\sum_{m=1}^{N} a_m \psi_m(r_i, t)\right|^2. \quad (13)$$

The fitness of the reconstruction can be easily obtained from the correlation between the set of components $\phi_\omega(r_i,t)$ and $\sum_{m=1}^{N} a_m \psi_m(r_i,t)$ in T'.

In summary, the gap filling/reconstructions method comprises the following steps:
1. Represent the events registered at CDR as vectors which component are the amplitude of probabilities of occupation for each location and time, as in Eq. (3).
2. Construct the density matrix from the most complete vectors set, as in Eq. (7).
3. Diagonalize the density matrix obtaining a basis of orthonormal vectors, assuming that basis are also the eigenvectors of the underlying pseudo-Hamiltonian.
4. For any incomplete vector, obtain the coefficients of this vector in the basis of the pseudo-Hamiltonian limited in the subspace where this vector is defined, as in Eq. (11).
5. Extrapolate these coefficients to the subspace where the vector is not defined.
6. Obtain the probabilities of occupation as the square of the obtained amplitudes as in Eq. (13).

As explained above, cell sites are distributed in space with the goal of exhaustively covering all the surface of a region with potential human activity to provide signal to any device at any point. Because of the technological limitations of the cell's band width, more antennas are needed in populated areas to guarantee total coverage to all potential activity. This generates a distribution for the location of the cells that empirically mimics the density of population, with a denser grid in urban areas and a scattered one in rural areas.

Assuming that the closest cell is the one providing a better signal for the device, the surface of the region can be divided by Voronoi cells following the locations of the sites. In this fashion, we can consider that a device is located at any point inside the Voronoi cell when an event is registered at that site. Thus, a sequence of events defines a path in the Voronoi grid, cell by cell.

Even if this representation has some advantages for measuring human mobility over other technologies, it is still unsatisfactory for many applications as the location or exact path of the device along the roads and streets of the region is not defined, with the corresponding loosing of accuracy.

Another embodiment of the invention relates to a method to accurately project the trajectories defined at the Voronoi grid defined by the sites and towers to the road and street grid. We make use of virtual agents moving randomly inside the road grid mimicking the movements of users in the real world, and select those which path and velocity are compatible with the events registered (or reconstructed) at the CDRs. We assign a probability or likelihood to each agent to represent the pattern that generates the observed events and aggregate all the agent's paths weighted by this likelihood to be used as a statistical measure of the empirical human mobility of the region.

The procedure can be applied one-to-one (one agent to fit the events of one device) or all-to-all (the same number of agents as users to fit the aggregated set of events). The all-to-all procedure is applied when the anonymity and privacy of the users is required. The outcome of the procedure is a set of trajectories or paths at the level of roads and streets with attributes of time, path length and velocity.

According to this method, one first assumes a set of $N_c$ cell sites and towers distributed in a certain region at positions $r_i$ (i=1, ..., $N_c$) and operating for a certain period of time T giving support to a certain number of devices N. Each device and each antenna are univocally identified (as much as technically possible) with an integer $\alpha$ ($\alpha$=1, ..., N) and i respectively. At each site, the metadata of every telecommunication event concurring at its coverage area along this period of time are collected, and all the data is centralized in a single or multiple set of data, the CDR. For each CDR labelled with j, we generate a pair $(i_j^\alpha, t_j^\alpha)$ locating the event at site i at time $t_j$ for user $\alpha$.

We define now the road graph as the network which nodes are crossings or junctions and vertex are the roads and streets of the region. We define $N_v > N$ virtual agents or random walkers that will move from node to node following the rules defined by the grid (first neighbors, directions, velocities, etc). The procedure follows:
1) Every walker x starts at a different random node of the road network, at a random initial time $t_0^x$ inside the interval T.
2) In a series of consecutive steps k=1, 2, 3 . . . , the walkers move to a random first neighboring node at each step, for a random maximum number of steps $k_m^x$. A velocity $v_k^x$ is assigned randomly at each step, as the mean velocity of the walker along that vertex.

We define a trajectory as the path followed by the walker along the graph in the series of steps. The final time of the path is obtained from the initial time $t_0^x$ plus the time required to travel along each vertex in each step $\Delta t_k^x = v_k^x / d_k^x$, where $d_k^x$ is the distance travelled at that same step along the vertex, as $$t_f^x = t_0^x + \sum_{k=1}^{k_m^x} \Delta t_k^x.$$

The average velocity of the full path for walker x is then $$\langle v \rangle = \sum_{k=1}^{k_m^x} v_k^x t_k^x / T,$$

where the time per step is considered.

We now assign a likelihood for each walker as the probability that its path generates a sequence of events as those observed at the CDRs. For the one-to-one case (N=1), where we have a sequence in time of n events $\{(i_j^\alpha, t_j^\alpha)\}_{j=1}^n$ for user $\alpha$, we apply the equation:

$$L_x = \prod_{j=1}^{n} P\left(r_{i_j}^\alpha \mid r_x(t_j^\alpha)\right) \quad (1)$$

where $P(r_i|r_x)$ is the probability of generating an event in antenna i from a location $r_x$ and $r_x(t)$ is the position of walker x at time t. For the sake of simplicity, we consider for P a power law with quadratic decay in the distance for the intensity of the signal, which is normalized considering all the neighboring antennas as:

$$P(r_i | r) = \frac{|r_i - r|^{-2}}{\sum_{i'=1} N_c |r_{i'} - r|^{-2}} \quad (2)$$

For the case of all-to-all (N>1), we extend eq. (1) to all antennas and all events as:

$$L_x = \prod_{a=1}^{N} \prod_{j=1}^{n} P\left(r_{i_j^a} \mid r_x(t_j^a)\right) \quad (3)$$

for all walkers x.

Next, we assign to each walker a weight according to his likelihood $L_x$. For a statistical representation of the real trajectories, we use this weight to select the N fittest walkers, or N'>N of the fittest walkers normalizing their contribution as $w_x = L_x / \sum_{x'}^{N'} L_{x'}$. In this fashion, w represents an estimation of the fraction of people—note that $w_x$ does not need to be 1 anymore—that has followed the path defined by walker x. However, since walkers are not fitted to individuals in the all-to-all case, it is important to notice that the meaningful statistical measures are those made at the level of aggregation of N walkers, as for instance the number of walkers crossing a preselected road, or the number of walkers with certain location for origin or destination of their trajectories.

In this way, the final output in a set of paths along the road graph with attributes of time, distance, and velocity, with a real number representing the relative weight of the contribution of each path.

While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the scope of this disclosure. This for example particularly the case regarding the different apparatuses which can be used.

The invention claimed is:

1. Human mobility measuring method wherein a set of cell sites and/or towers, each comprising an antenna, distributed in a certain region and operating for a certain period of time giving support to a certain number of devices, wherein at each site, metadata of every telecommunication events concurring at its coverage area along this period of time are collected, and all the data is centralized in a single or multiple set of CDR raw metadata, said method comprising a structuring step where CDR raw metadata is filtered so as to identify at least one of a device identification, a cell site identification, a date, and a time,
   a data frame generating and sorting step where the filtered CDR metadata is sorted by user, by date, and by time,
   a projecting step where the filtered sorted CDR metadata of each device are projected into an occupancy grid comprising a location vs. time-bin matrix, where locations are defined by groups of sites or towers, and time is divided in bins of arbitrary size,
   a probabilistic map generating step of a device's location in space and time,
   a filtering step consisting in filtering devices and events that accurately represent human mobility from patterns that reflect errors, uncertainties, or patterns not related with real human mobility, and
   a gap filling process allowing for a continuous localization of the device by extrapolating any trajectory in space and time of any device, wherein the gap filling process comprises:
      a first step consisting in representing the events registered at CDR as vectors which components are the amplitude of probabilities of occupation for each location and time,
      a second step of constructing a density matrix from the vectors set obtained in the first step,
      a third step of diagonalizing the density matrix obtaining a basis of orthonormal vectors, assuming that basis are also the eigenvectors of an underlying pseudo-Hamiltonian,
      a third step of obtaining, for any incomplete vector, the coefficients of this vector in the basis of the pseudo-Hamiltonian limited in the subspace where this vector is defined,
      a fourth step of extrapolating these coefficients to the subspace where the vector is not defined, and
      a fifth step of obtaining the probabilities of occupation as the square of the obtained amplitudes.

2. The method of claim 1, wherein each device and each antenna are univocally identified.

3. The method of claim 1, wherein at least one of the groups is composed of a single site.

4. The method of claim 1, wherein the filtering step comprises filtering devices when more than one person is using the same number or duplicated SIM cards.

5. The method of claim 1, wherein the filtering step comprises filtering devices when in locations covered by several sites, the device may dynamically switch its connectivity between even if no movement is related with the event.

6. The method of claim 1, wherein the filtering step comprises filtering devices when a cell is reaching its maximum capacity, nearby cells are assigned to handle the extra events.

7. The method of claim 1, further comprising assigning a probability or likelihood to each agent to represent the pattern that generates the observed events, and aggregate all the agent's paths weighted by this likelihood to be used as a statistical measure of the empirical human mobility of the region.

8. The method of claim 1, wherein the filtering step comprises filtering devices when two or more devices communicate with each other in a regular basis and systematically from the same locations.

9. The method of claim 1, further comprising a projecting step comprising projecting the trajectories defined at a Voronoi grid defined by the sites and towers to the road and street grid.

10. The method of claim 9, further comprising virtual agents moving randomly inside the road grid mimicking movements of users in the real world, and select those which path and velocity are compatible with the events registered at the CDRs.

* * * * *